US011715145B2

(12) United States Patent
Laserson et al.

(10) Patent No.: US 11,715,145 B2
(45) Date of Patent: Aug. 1, 2023

(54) SEGMENT-BASED RECOMMENDATION ENGINE

(71) Applicant: NCR Corporation, Atlanta, GA (US)

(72) Inventors: Itamar David Laserson, Givat Shmuel (IL); Rotem Chudin, Kfar-Saba (IL); Julie Dvora Katz Ohayon, Ashdod (IL); Moshe Shaharur, Tel-Aviv (IL)

(73) Assignee: NCR Corporation, Atlanta, GA (US)

( * ) Notice: Subject to any disclaimer, the term of this patent is extended or adjusted under 35 U.S.C. 154(b) by 280 days.

(21) Appl. No.: 17/084,785

(22) Filed: Oct. 30, 2020

(65) Prior Publication Data
US 2022/0138829 A1 May 5, 2022

(51) Int. Cl.
G06Q 10/087 (2023.01)
G06Q 30/0601 (2023.01)
G06N 20/00 (2019.01)
G06F 16/2457 (2019.01)
G06F 9/54 (2006.01)
G06Q 30/018 (2023.01)
G06Q 30/0201 (2023.01)
G06K 19/06 (2006.01)

(52) U.S. Cl.
CPC ........... G06Q 30/0631 (2013.01); G06F 9/54 (2013.01); G06F 16/24578 (2019.01); G06N 20/00 (2019.01); G06Q 10/087 (2013.01); G06Q 30/0185 (2013.01); G06Q 30/0201 (2013.01); G06K 19/06028 (2013.01)

(58) Field of Classification Search
None
See application file for complete search history.

(56) References Cited

U.S. PATENT DOCUMENTS

| 7,181,438 B1* | 2/2007 | Szabo | G06F 21/6245 |
| | | | 705/14.27 |
| 9,760,802 B2* | 9/2017 | Chen | G06Q 30/0251 |
| 2003/0037041 A1* | 2/2003 | Hertz | H04N 21/252 |
| | | | 348/E7.071 |

(Continued)

OTHER PUBLICATIONS

Prateek "Advanced E-Commerce NLP Project Python Recommendation Structured Data Technique Unsupervised", Jul. 30, 2019, 50+ Exciting Industry Projects to become a Full-Stack Data Scientist Download Projects, Jul. 30, 2019, pp. 1-8 x (Year: 2019).*

(Continued)

Primary Examiner — Romain Jeanty
(74) Attorney, Agent, or Firm — Schwegman Lundberg & Woessner, P.A.

(57) ABSTRACT

Transaction items for a transaction are received during a transaction. Any non-barcoded items are identified and processed within a retailer-specific vector space to identify a most-similar barcoded item offered by a corresponding retailer to the non-barcoded item. The transaction items are revised to include the most-similar barcoded item as a replacement for the non-barcoded item. The revised transaction item list is used to identify a recommended item based on a segment-specific vector space associated with a segment assigned to the transaction. The recommended item is provided in real time to a transaction service that processes the transaction for delivery to a customer associated with the transaction.

20 Claims, 4 Drawing Sheets

(56) References Cited

U.S. PATENT DOCUMENTS

| | | | |
|---|---|---|---|
| 2008/0294617 A1* | 11/2008 | Chakrabarti | G06F 16/9535 707/999.005 |
| 2009/0271246 A1* | 10/2009 | Alvarez | G06Q 30/02 705/26.7 |
| 2014/0180790 A1 | 6/2014 | Boal | |
| 2014/0279208 A1 | 9/2014 | Rosie | |

OTHER PUBLICATIONS

Noor "A Tag-based Personalized Item Recommendation System using Tensor Modeling and Topic Model Approaches", Jul. 2014, ACM International Conference on Research and Development in Information Retrieval, p. 1 (Year: 2014).*
EP Search Report.

* cited by examiner

SEGMENT-BASED RECOMMENDATION ENGINE

BACKGROUND

The usage of product recommendation engines is essential to retailers worldwide. According to various retail studies product recommendation engines provide a 10-25% increase in overall sales. This is even more important in the E-Commerce channel, where customers who click on the product recommendations have a 5.5 times higher conversion rate (online store visits that convert to an actual purchase) than those who do not. Retailers that fail to adopt effective product recommendation methods will lag behind in the rapidly growing E-commerce channel.

The grocery segment, unlike other segments, is characterized by large baskets. The average basket in an E-commerce grocery transaction contains ~30 items. With so many items in the basket, recommendations should be updated and adjusted as the shopping journey progresses and the basket grows. An effective recommendation engine would, therefore, rely on the current combination of the basket to recommend the customer what to buy next. But Current recommendation engines fail to do so.

Current solutions rely on customers' segmentation and shopping history but do not adequately leverage the information that lies in current basket cart content when providing the recommendation. Grocery retailers are therefore, not maximizing the potential in recommendation engines and are losing millions of dollars in lost sales.

Recommendation engines also rely on their existing customer data; however, for some retailers the customer data is not large enough to make effective customer-specific recommendations. Moreover, for large retailers the customer data may be voluminous, but it lacks focus directed to specific demographics associated with the customer that is receiving a recommendation, such that the recommendations are too generic and is not personal enough to the customer to induce a sale out of the customer.

SUMMARY

In various embodiments, methods and a system for segment-based and cross-retail recommendations is presented.

According to an aspect, a method for segment-based and cross-retail recommendations is presented. For example, item codes for items in a transaction with a retailer are obtained. A segment constraint associated with the transaction is acquired. A particular item code associated with a particular item is identified that lacks an item barcode from the item codes. A similar item code for a similar item to the particular item is determined from a retailer-specific vector space. The item codes are revised by replacing the particular item code with the similar item code and producing revised item codes for the transaction. A recommended item code is determined based on the revised item and a segment-specific vector space associated with the segment constraint. The recommended item code is provided to an interface associated with the transaction for recommending to a customer associated with the transaction.

DETAILED DESCRIPTION

Figure 1A:
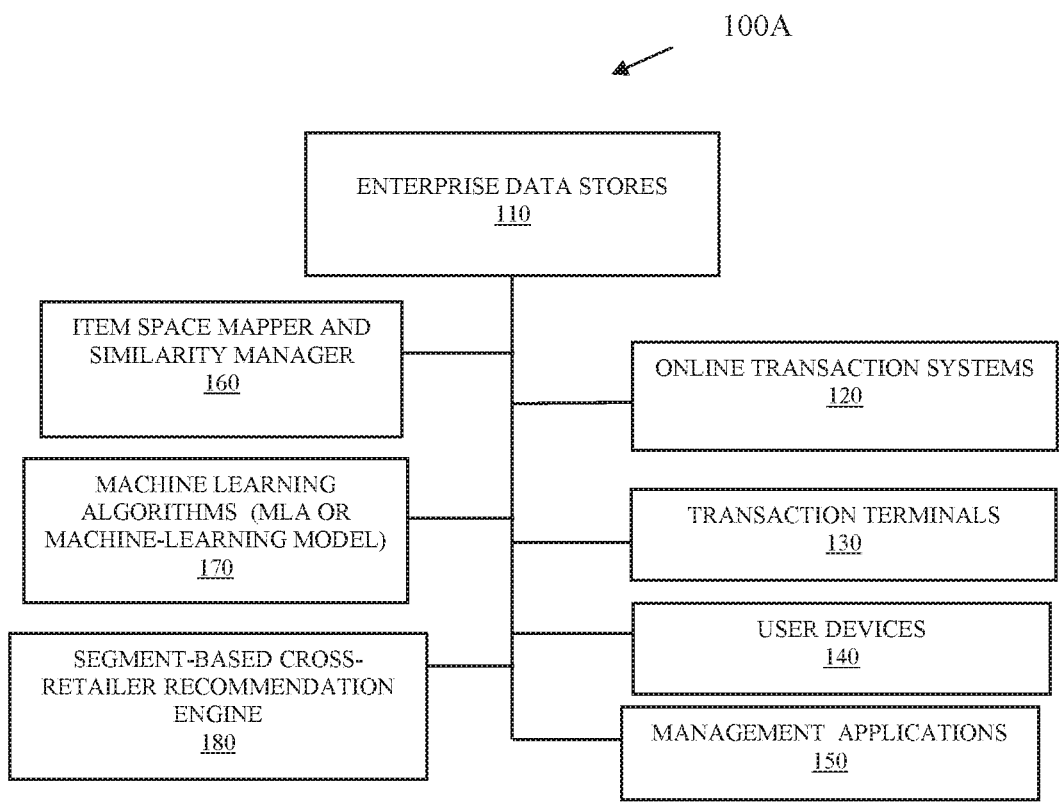
FIG. 1A is a diagram of a system for segment-based and cross-retail recommendations, according to an example embodiment.

FIG. 1A is a diagram of a system 100 for segment-based and cross-retail recommendations, according to an example embodiment. It is to be noted that the components are shown schematically in greatly simplified form, with only those components relevant to understanding of the embodiments being illustrated.

Furthermore, the various components (that are identified in the FIGS. 1A and 1B) are illustrated and the arrangement of the components is presented for purposes of illustration only. It is to be noted that other arrangements with more or less components are possible without departing from the teachings of segment-based and cross-retail recommendations presented herein and below.

As will be discussed in greater detail herein and below, system 100A provides a retail-service platform that provides segment-based product recommendation based on an existing or in progress transaction and the basket of items associated with that in-progress transaction. The platform hosts multiple tenants (customers or retailers and their business/transaction environment). This provides a large enough number of customers with extensive data (transactions, catalogs, product/item prices, and promotions/discounts) of retail stores spread across the globe. For example, in a specific region, such as Atlanta, Ga., the platform holds the above data for every store within the Atlanta region who is connected to its' platform. Data will include multiple stores across multiple cultures across multiple retailers. The majority of items in the product/item catalog already include manufacturer barcodes (Universal Product Codes (UPCs)). In other words, the same can of Coke® will have the same barcode in any store within a certain region regardless of which chain the store belongs to.

System 100A enhances current recommendation engines by adding recommendations on a per specific basket utilizing data from multiple retailers and data specific to a defined segment. System 100A recommends to a given shopper which items to add based to their basket based on the current content (items) of the basket (the combination of all items that currently exist in the basket) and adjusts the recommendations as the basket changes during the shopping journey.

System 100A provides a mechanism by which item codes of a product catalogue represents words. A transaction is comprised of the item codes representing the items of that transaction. The mixture or combination of item codes (words) in a given transaction represents a sentence. The item codes are assigned a vector representing a context in which the items that correspond to the item codes were purchased based on analysis of transactions for which the items were purchased. The item vectors represent positions within multidimensional space. Given a transaction having a basket of items, the corresponding item vectors are obtained for that transaction and probabilities that a next item to add to the transaction is produced and sorted in decreasing probabilities. As items are added or removed from a given transaction, the item vectors for the item codes change. At any given point in time, the probabilities between the item vectors and other item codes within the multidimensional space can be calculated. These probabilities are associated with items that are not in the present transaction but are likely to added next based on the context of the item vectors that comprise the present transaction. A configured threshold probability is set, such that when a given probability between item vectors plotted in the multidimensional space for the current transaction is at or below the threshold probability, an assumption is made that the item associated with the given probability should be recommended to be included within the current transaction as an item that a consumer should like to purchase with his/her transaction.

A "Word2Vec" algorithm is used to assist in the focused recommendations. Word2Vec is a group of algorithms used primarily in the field of natural language processing (NLP) for machine translation. Word2Vec takes as its input a large corpus of text and produces a vector space, typically of several hundred dimensions, with each unique word in the corpus being assigned a corresponding vector in the space. Word vectors are positioned in the vector space such that words that share common contexts in the corpus are located in close proximity to one another in the space. System 100A applies the Word2Vec model to the retailer's catalog. The "large corpus of text" is represented as the retailer's Transaction Data Module/Manager (TDM). The "sentences are provided as input as the transactions in the TDM. Each transaction is defined as a set of items—"words." Each retailer catalogue item is represented as a numeric vector such that similar items will have a smaller distance in the vector space. By embedding millions of catalog items into numeric vector significant strength is created for correlations between different items. Mathematical methods can be applied on the vectoral numeric representation of the catalog items to study the affinity between items and extract valuable information that can processed for monetization. This approach is a data driven approach.

This data driven approach is further focused on, such that given a set of words (comprised in a given basket of a transaction as item codes), System 100A can assess the probability for any other word in the dictionary to appear in the same sentence as the given set of words. This means that given a partial basket (a set of items) System 100A can assess the probability of any other item in the catalog to be added to the basket. In other words, when applying "Word2Vec" on a large enough set of transactions, System 100A can provide product recommendations for any given basket, based on the *combination* of items that exist in the basket. Recommendations rely purely on data that reflects all customers' shopping patterns as measured and quantified based on millions of past recorded transactions. This approach does not require manual intervention as commonly needed today, where promotion experts include presumed logic in their recommendation engines.

Furthermore, the vector space from which predictions are made as to what the next word or item is to be in a given transaction (basket), is derived from a retailer-defined segment and the transactions associated with that segment are collected across multiple retailers and their corresponding transactions. The barcoded item codes are plotted as barcoded item vectors within the retailer-defined segment that spans multiple retailers. This makes the recommendations specific to a retailer-defined segment across multiple retailers and provides focused data that is voluminous, which ensures that not only are the recommendations more accurate and focused but small retailers with relatively few transactions can benefit from the recommendations while large retailers obtaining more precise recommendations likely to induce customer purchases from the recommendations (up-selling).

The segments and their corresponding vector space will be the same across retailers connected to the platform; however, the resulting recommendations will be unique to each individual retailer since each retailer has its on product or item catalogue (e.g., own unique set of item codes and items). That is, recommendations of items to add to the basket for any given retailer will be an item code that is offered by that retailer through that retailer's product catalogue.

Barcoded items provide the cross-retailer normalization needed to utilize a single vector space per segment. However, some retailers may include items that are not barcoded. System 100A solves this issue by creating individual vector spaces and vector mappings for each individual retailer and their product catalogues. When a non-barcoded item is detected in the basket of items for a transaction, a most similar item to that non-barcoded item that does have a barcode is found from the retailer-specific vector space. This provides a link to a mapped barcoded item in the common vector space that spans multiple retailers, since the retailer most-similar item to the non-barcoded item includes a barcode and is already mapped in the common segment-based vector space.

It is within this context that FIGS. 1A, 1B, and 2-3 are now discussed.

System 100A comprises an enterprise data store 110, online transaction systems 120 that span multiple different retailers, in-store transaction terminals 130 associated with multiple different retailers, user devices 140 operated by multiple different customers and/or employees of multiple different retailers, management applications (apps) 150 associated with multiple different retailers, an item space mapper and similarity manager 160, one or more machine-learning algorithms (MLA) 170, and a segment-based cross-retailer recommendation engine 180. System 100A comprises a variety of computing devices, each of which comprises at least one processor and a non-transitory computer-readable storage medium comprising executable instructions. The executable instructions when executed by the corresponding processor from the corresponding non-transitory computer-readable storage medium causes that processor to perform operations discussed herein and below with respect to the components 110-180.

An "item code" represents an item from a given retailer's product catalogue. Each item code's affinity/similarity to the other item codes defines that item's vector in multidimensional space (defined by transaction histories where that item code appears). The affinity/similarity and item code vector determined by Word2Vec algorithms based on analysis of the retailer's transaction histories and product catalogue. An "item vector" is a mathematical expression showing points within the multidimensional space representing the contexts of a given item.

Item space mapper and similarity manager 160 utilizes a plurality of Word2Vec algorithms for item codes of items. Each identified culture comprises its multidimensional space for plotted item vectors for the corresponding item codes. Each vector space is based on aggregated transaction data that spans transactions across multiple-retailers associated with a given segment. Each vector space per segment comprises mapped item vectors for barcoded items that span multiple retailers associated with the corresponding culture.

Item space mapper and similarity manager 160 also processes separate Word2Vec algorithm specific to a given retailer's transaction data for both that retailer's barcoded items and any non-barcoded items to create a retailer-specific vector space with mapped non-barcoded item vectors and mapped barcoded item vectors for that retailer. This creates separate vector spaces specific to each retailer with mapped item vectors for barcoded items and mapped non-barcoded item vectors for non-barcoded items.

Recommendation engine 180 receives real-time item codes for items in a current basket of a consumer through an API associated with transaction services of online transaction systems 120, terminals 130, and/or user devices 140. Item space mapper and similarity manager 160 expresses the current basket as item vectors that plots the item codes of the current basket into multidimensional space (of a specific segment) defining a context through that segment space (as discussed above). Next, recommendation engine 180 identifies any item code in the basket that lacks an item vector, which is an indication that such item lacks a barcode for the transaction.

Any non-barcoded item code is provided by recommendation engine 180 to Item space mapper and similarity manager 160 and similarity scores are returned from the retailer-specific vector space. Item space mapper and similarity manager 160 (may also be referred to as "mapper 160" herein) uses the similarity scores to identify a closest in space barcoded item code to the non-barcoded item code. The barcoded retail-specific barcoded item code is then linked to the non-barcoded item code. The barcoded retail-specific barcoded item code is also present in the segment-based vector space and can then be processed by item space mapper and similarity manager 160 within the context of all barcoded items for the transaction to return similarity scores for other barcoded item codes present in the segment-based vector space, which are relevant to the entire basket of items in the transaction (basket context comprising all transaction item codes and the replaced similar item code). Recommendation engine 180 may use a threshold distance between the barcoded item codes to compare against the returned similarity scores and decides to provide the most relevant barcoded item code associated with the selected similarity score to the transaction data manager (181 discussed below with FIG. 1B). Recommendation engine may first check to see if the selected or recommended barcoded item is present in the retailer's item catalogue (112 discussed below with FIG. 1B within the context of processing at 182). This ensures that the selected barcoded item code that is to be recommended to a customer during a transaction is available from the retailer to recommend. If the original selected barcoded item code selected for recommendation is not available from the retailer, a next barcoded item code is selected from the similarity scores, this can continue until a recommended item code is found in the retailer's item catalogue 112.

The items that correspond to the item codes being recommended are communicated in real time by the recommendation engine 180 to a consumer associated with the ongoing transaction and its current basket of items or shopping cart. Transaction services and/or transaction software may evaluate retailer-defined rules to determine how the items being recommended are to be presented to the consumer; for example, one or more of the items being recommended may be associated with a retailer-based promotion. Transaction services and/or transaction software may also record or note transactions for which an item upsell recommendation was made and accepted by the consumer. This may assist with determining the success rate of recommendation engine 160.

MLAs 170 may be used to improve the accuracy of making recommendations for items during transactions. This can be obtained by using a feedback look where the transaction associated with an upsell item recommendation is evaluated after the transaction completes to determine if the item recommendation was purchased (positive feedback) or not purchased (negative feedback). The MLAs 170 represent a machine-learning model trained on the segment item codes, similarity scores, segment vector space identifiers, transaction details of transactions, and recommended item along with the success or failure result. In this way, as the MLAs 170 are trained and become more accurate, recommendation engine may pass retailer-available recommended item codes, their similarity scores, the transaction details, and a segment vector space identifier and the MLAs 170 return the most likely item code that is most likely to cause the customer of a transaction to be purchased with the current transaction.

Recommendation engine 180 uses a given retailer's specific mapped vector space comprising that retailer's mapped barcoded item vectors and non-barcoded item vectors for purposes of determining most similar mapped barcoded items to the corresponding non-barcoded items. This is done by calculating the distance between a given non-barcoded item vector to a nearest plotted barcoded item vector within the retailer-specific vector space. To do this, recommendation engine 180 passes a non-barcoded item code and an identifier for the retailer-specific vector space to item space mapper and similarity manager 160. Item space mapper and similarity manager 160 obtains the corresponding retailer-specific vector space and uses the non-barcoded item code to obtain the non-barcoded item vector. Next, item space mapper and similarity manager 160 calculates distances within the retailer-specific vector space between the non-barcoded item vector and other barcoded and non-barcoded item vectors within that space to produce similarity scores. A higher score is indicative of a closer item vector to the non-barcoded item vector. A top percentage of the scores and the corresponding item codes associated with the scores are returned to recommendation engine 180 as output.

Recommendation engine 180 checks the returned item codes and similarity scores and identifies a closet or most similar match between the non-barcoded item code and a known barcoded item code available from the retailer's item catalogue 112. The non-barcoded item code and all the other barcoded items in the basket are passed as input back to the item similarity and mapper 160 with an identifier for the segment to which the transaction is associated (the segment identifier allows mapper 160 to identify the provider segment-specific vector space to use when finding items that are close in that space to the context of all the basket items). Suggested recommendation item code similarity scores are then returned by mapper 160 for item codes that are most likely to be purchased with the current combination of basket of items for the transaction. Recommendation engine 180 takes a predefined number or percentage of the top similarity scores and checks that the corresponding item codes are available in the retailer's item catalogue 113, the actual items that are available are evaluated for selecting the most likely item that the customer is likely to buy based on that item being available from the retailer. This recommended item code is then provided via an Application Programming Interface (API) to the transaction data manager 181 of the retailer for presentation to the customer during the transaction. In an embodiment, as discussed above the selection of the recommended item may also be made or simultaneously decided by MLAs 170.

In an embodiment, mapper 160 may add all the barcoded item codes together to product a single vector for the transaction as a whole and plot that within the segment-specific vector space, this allows the item's closest in distance to be identified and similarity scores for those items to be identified readily based on a vector for the transaction representing a sum of the individual items in the basket (context based).

Each enterprise data store 110 includes a variety of enterprise data, such as transaction histories for transactions performed with a retailer. Other types of data may be included in enterprise data store 100 as well, such as incentives available to consumers, item prices for the transaction, customer data for known customers (loyalty data, profile data, etc.), the transaction details for transactions of customers (including item codes for items), item or product catalogue data, and other information captured and retained by the enterprise for the store and other stores associated with the enterprise (retailer).

Each online transaction system 120 comprises interfaces and corresponding software by which customers perform online transactions with a retailer, such as via browsing items, storing selected items in a virtual cart, and checking out (paying for) items in the virtual cart. The online transaction system 120 can be web-based and/or mobile app-based. Virtual cart data provided in real time from online transaction system 120 to enterprise data store 110 or provided via an Application Programming Interface (API) in real time to price alert manager 190 during an online shopping session.

Transaction terminals 130 comprise peripheral devices (scanners, printers, media acceptors/dispensers, weigh scales, Personal Identification Number (PIN) pads, card readers, etc.) and corresponding software for performing customer checkouts associated with transactions. Real-time item and transaction data provided by terminals to their corresponding enterprise data store 110.

User devices 140 comprise peripherals (touchscreens, cameras, etc.) and corresponding software for performing customer transactions using a web browser or a mobile application (app). Real time transaction data provided by any app to a corresponding retailer's enterprise data store 110.

Management applications 150 comprises retailer-specific interfaces and features/functions that permit employees of a corresponding retailer to monitor and adjust item pricing, product catalogues, monitor retailer assets, and manage retailer assets.

Figure 1B:
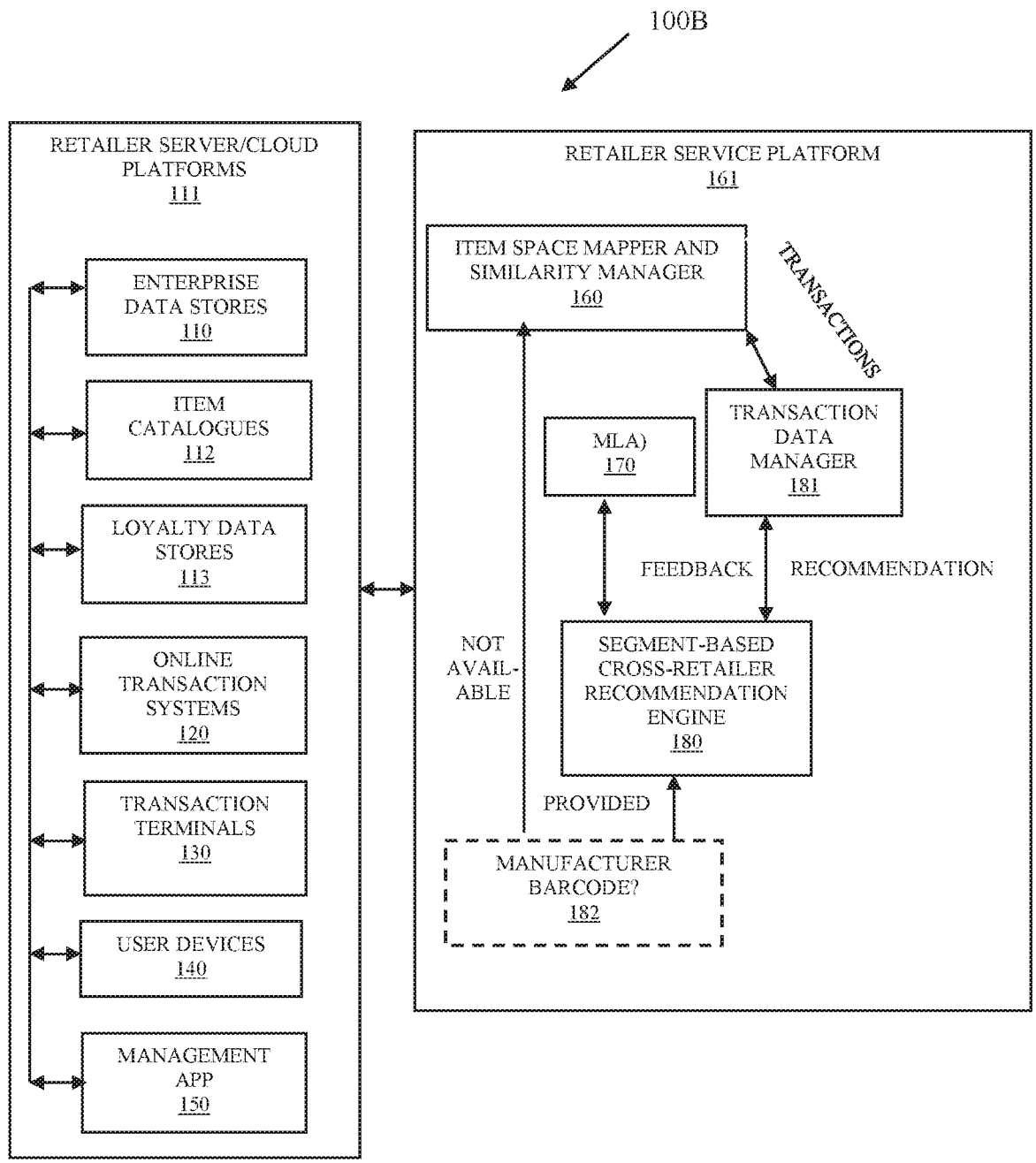
FIG. 1B is a diagram representing a process flow of the system of FIG. 1A, according to an example embodiment.

FIG. 1B is a diagram representing a process flow 100B of the system of FIG. 1A, according to an example embodiment.

FIG. 1B illustrates a more fine-grain view of some components associated with system 100A.

Each retailer has its own server/cloud platform/environment 111, which includes that retailer's enterprise data store 110, item catalogues 112, loyalty data stores 112, online transaction systems 120, transaction terminals 130, user devices 140, and management applications 150. Each retailer platform 111 is connected to a retailer-service platform 161 via an instance of a transaction data manager 181. Each retailer service platform 161 comprises item space mapper and similarity manager 160, MLAs 170, platform-based cross-retailer categorization service 180, and connected instances of each retailer's transaction data manager 181.

Each retailer's item catalogue 112 is accessible to platform 161 and transaction processed are handled by a retailer-specific instance of transaction data manager 181. Transaction data is fed to item space and similarity manager 160 where segment specific vector spaces are created, and barcoded item codes are mapped to the corresponding vector spaces through barcoded item vectors generated by item space and similarity manager 160. Item space mapper and similarity manager 160 also creates a retailer-specific vector space for each retailer using that retailer's transaction data and that retailer's item catalogue.

Any non barcoded item in a given retailer's transaction data or item catalogue (182) is detected by recommendation engine 180 causing recommendation engine 180 to provide the non-barcoded item code and an identifier for the retailer or the retailer's vector space to be passed as input to item space mapper and similarity manager 160. Item space mapper and similarity manager 160 returns item codes and similarity values for item code vectors plotted in the retailer's vector space that are in proximity to the non-barcoded item code. Recommendation engine 180 identifies a closest barcoded item code from the returned item codes and similarity values. Recommendation engine 180 replaces the original non-barcoded item found in the transaction with the most similar item code and provides all of the transaction item codes (with the replacement most similar code) along with a segment vector space identifier as input to mapper 160.

Mapper 160 returns similarity codes and corresponded recommended item codes associated with the combination of all transaction item codes (which now includes the most similar item code that was replaced) to recommendation engine 180. Recommendation engine 180 filters the returned recommended item codes within the retailer item catalogue 112 and then makes a decision based on the remaining recommended item codes as to which recommended item code to provide via an API to TDM 181. Again, MLAs 170 may be used to make the selection of the final recommended item code on behalf of recommendation engine 180 (as discussed above).

Barcoded items in the basket are directly passed to mapper 160 and processed by mapper 160 and recommendation engine 180 as discussed above. That is, there is no need to find a most similar barcoded item in the given retailer's item catalogue 112 when an item in the basket already includes the barcoded item. That is, the transaction is associated with the specific retailer, such that any barcoded item in the transaction will be in the item catalogue 112, therefore, recommendation engine 180 need only check and replace any non-barcoded item with a most similar item before sending a revised transaction item code list to mapper 160 for finding a recommended item to provide for the transaction.

Once the transaction completes, an indication is obtained from the transaction data as to whether or not the final recommended item code was purchased with the transaction and that indication is used as feedback during subsequent training sessions with MLAs 170.

The segment identifier for the segment may be assigned to the transaction by TDM 181 and made available through an API to recommendation engine along with the basket item codes for the transaction.

A segment may comprise any retailer defined constraint, such as geographical constraint, income constraint associated with known include level of a registered customer of the retailer and available through a profile of customer housed in loyalty store 113, a gender from the profile, an age from the profile, a nationality from the profile or the geographical location, etc.

In an embodiment, a single retailer can be associated with multiple different segments to which the retailer wants to participate in through platform 161.

In an embodiment, components 110-113 and 160-190 are provided as a single cloud-based service to components 120, 140, and 150 via an API.

These and other embodiments are now discussed with reference to the FIGS. 2-3.

Figure 2:
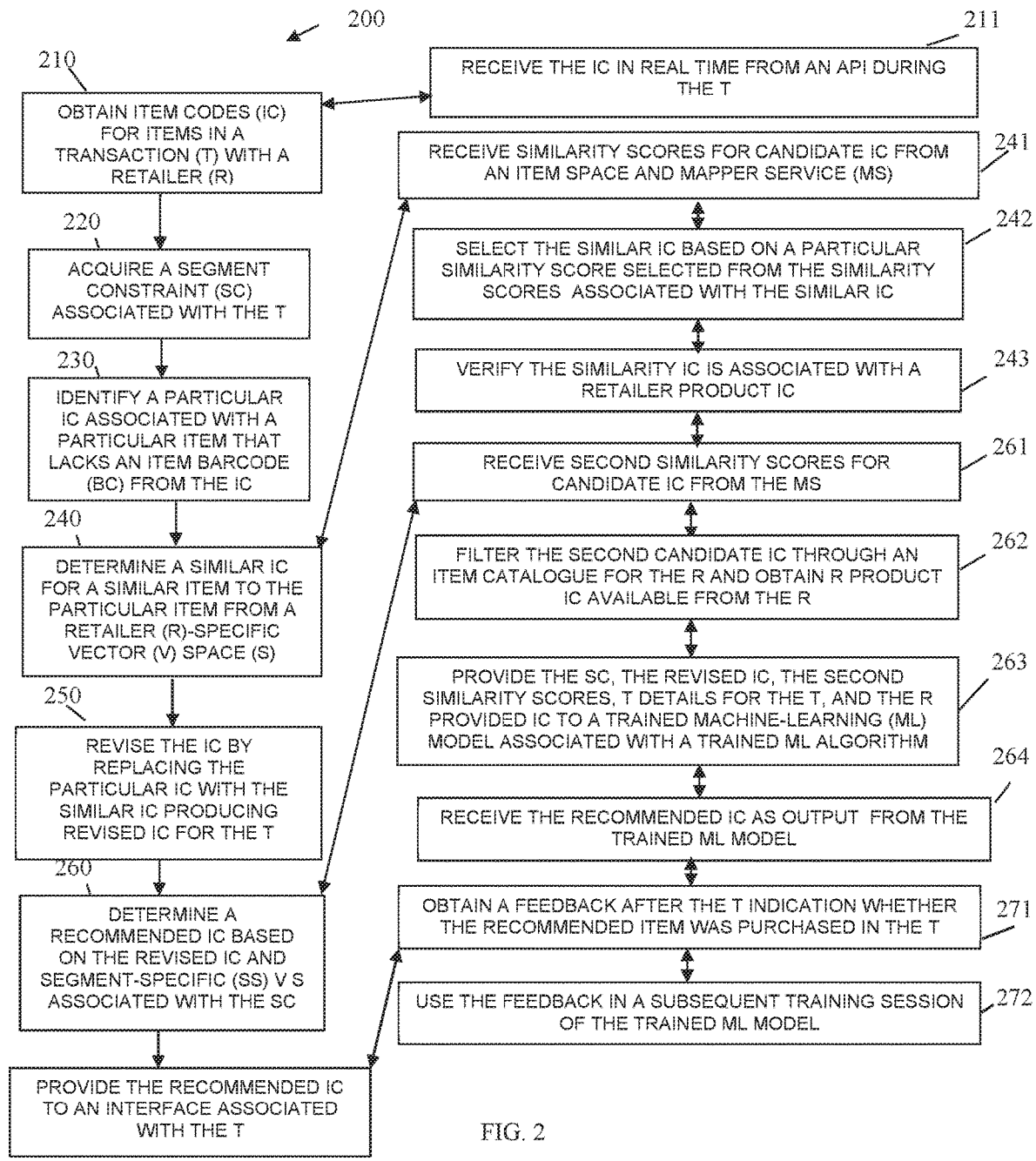
FIG. 2 is a diagram of a method for segment-based and cross-retail recommendations, according to an example embodiment.

FIG. 2 is a diagram of a method 200 for segment-based and cross-retail recommendations, according to an example embodiment. The software module(s) that implements the method 200 is referred to as a "cross-retailer segment-based recommendation service." The cross-retailer segment-based recommendation service is implemented as executable instructions programmed and residing within memory and/ or a non-transitory computer-readable (processor-readable) storage medium and executed by one or more processors of a device. The processor(s) of the device that executes the cross-retailer segment-based recommendation service are specifically configured and programmed to process the cross-retailer segment-based recommendation service. The cross-retailer segment-based recommendation service has access to one or more network connections during its processing. The network connections can be wired, wireless, or a combination of wired and wireless.

In an embodiment, the device that executes the cross-retailer segment-based recommendation service is a server. In an embodiment, the server is a cloud processing environment that comprises multiple servers cooperating with one another as a single server. In an embodiment, the server is a Local Area Network (LAN) server.

In an embodiment, the cross-retailer segment-based recommendation service is all of or some combination of 160-190.

In an embodiment, the cross-retailer segment-based recommendation service performs the processing discussed above with system 100A and process flow 100B.

In an embodiment, the cross-retailer segment-based recommendation service is provided as a SaaS to a plurality of enterprises, each enterprise having a subscription relevant to its customers, item catalogue 112, loyalty store 113, and enterprise data store 110.

At 210, the cross-retailer segment-based recommendation service obtains item codes for items in a transaction with a retailer.

In an embodiment, at 211, the cross-retailer segment-based recommendation service receives the item codes in real time from an API during the transaction and before the transaction is concluded.

At 220, the cross-retailer segment-based recommendation service acquires a segment constraint associated with the transaction.

At 230, the cross-retailer segment-based recommendation service identifies a particular item code associated with a particular item that lacks an item barcode from the item code.

At 240, the cross-retailer segment-based recommendation service determines a similar item code for a similar item to the particular item from a retailer-specific vector space.

In an embodiment, at 241, the cross-retailer segment-based recommendation service receives similarity scores for candidate item codes from an item space and mapper service 160.

In an embodiment of 241 and at 242, the cross-retailer segment-based recommendation service selects the similar item code based on a particular similarity score selected from the similarity scores associated with the similar item code.

In an embodiment of 242 and at 243, the cross-retailer segment-based recommendation service verifies the similarity item code is associated with a retailer product item code having a barcode.

At 250, the cross-retailer segment-based recommendation service revises the item codes by replacing the particular item code with the similar item code and producing revised item codes for the transaction.

At 260, the cross-retailer segment-based recommendation service determines a recommended item code based on the revised item codes and a segment-specific vector space associated with the segment constraint.

In an embodiment of 243 and 260, at 261, the cross-retailer segment-based recommendation service receives second similarity scores for candidate item codes from the item space and mapper service 160.

In an embodiment of 261 and at 262, the cross-retailer segment-based recommendation service filters the second candidate item codes through an item catalogue for the retailer and obtains retailer product item codes available from the retailer.

In an embodiment of 262 and at 263, the cross-retailer segment-based recommendation service provides the second candidate item codes, the revised item codes, the second similarity scores, transaction details for the transaction, and the retailer provided item codes to a trained machine-learning module associated with a trained machine-learning algorithm.

In an embodiment of 263 and at 264, the cross-retailer segment-based recommendation service receives the recommended item code as output from the trained machine-learning model.

At 270, the cross-retailer segment-based recommendation service provides the recommended item code to an interface associated with the transaction for presentation to a customer associated with the transaction.

In an embodiment of 264 and 270, at 271, the cross-retailer segment-based recommendation service obtains a feedback after the transaction indication whether the recommending item was purchased in the transaction.

In an embodiment of 271 and at 272, the cross-retailer segment-based recommendation service uses the feedback in a subsequent training session of the trained machine-learning model.

Figure 3:
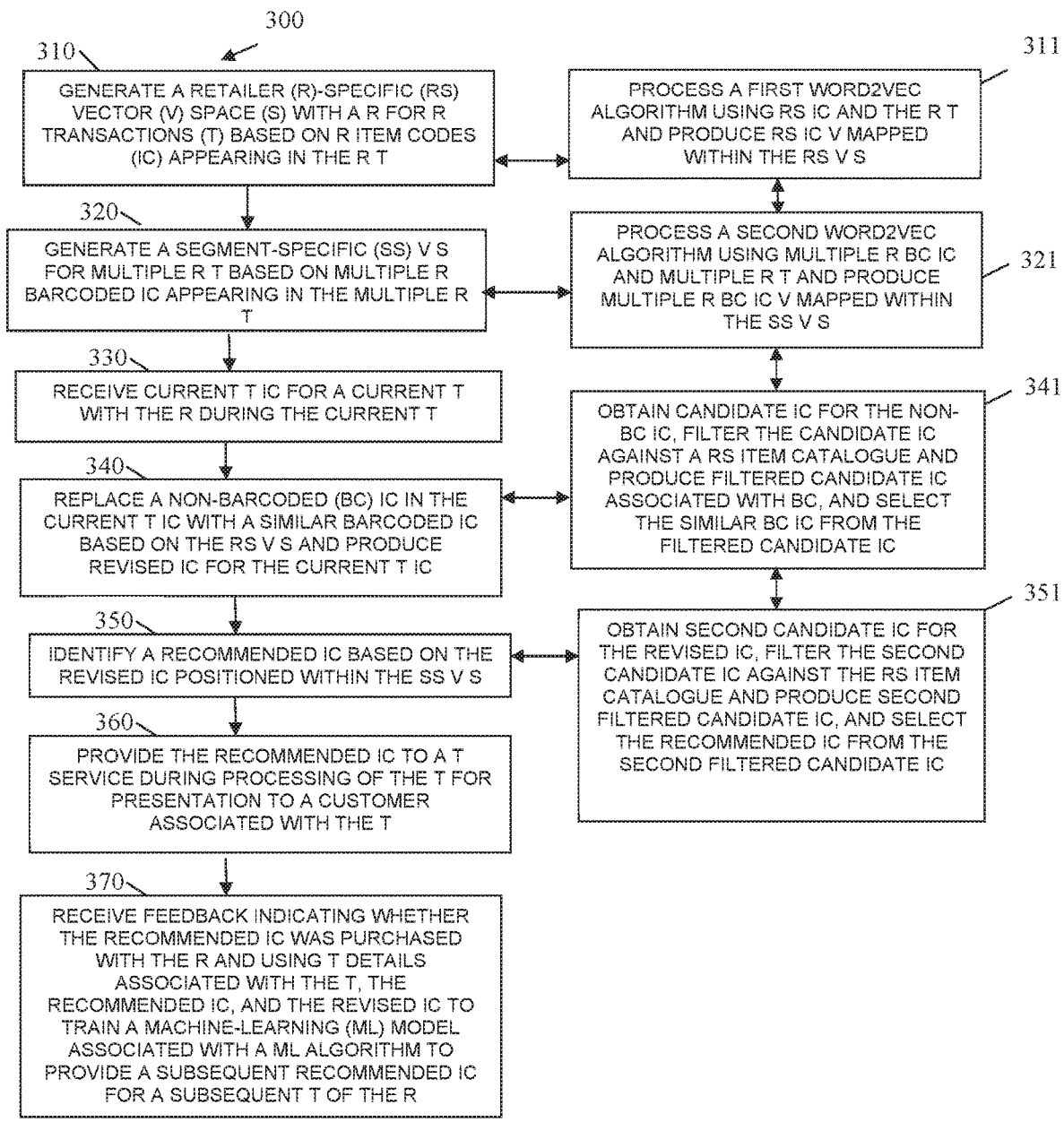
FIG. 3 is a diagram of another method for segment-based and cross-retail recommendations, according to an example embodiment.

FIG. 3 is a diagram of another method 300 for segment-based and cross-retail recommendations, according to an example embodiment. The software module(s) that implements the method 300 is referred to as a "basket segment recommendation service." The basket segment recommendation service is implemented as executable instructions programmed and residing within memory and/or a non-transitory computer-readable (processor-readable) storage medium and executed by one or more processors of a device. The processors that execute the basket segment recommendation service are specifically configured and programmed to process the basket segment recommendation service. The basket segment recommendation service has access to one or more network connections during its processing. The network connections can be wired, wireless, or a combination of wired and wireless.

In an embodiment, the device that executes the basket segment recommendation service is a server. In an embodiment, the server is a cloud processing environment that comprises multiple servers cooperating with one another as a single server. In an embodiment, the server is a LAN server that is local to a retail store.

In an embodiment, the item basket segment recommendation service is all or some combination of 160-181, process flow 100B, and/or the method 200.

The basket segment recommendation service presents another and, in some ways, enhanced processing perspective to that which was described above with the FIG. 2.

At 310, the basket segment recommendation service generates a retailer-specific vector space with a retailer for retailer transactions based on retailer item codes appearing in the retailer transactions.

In an embodiment, at 311, the basket segment recommendation service processes a first Word2Vec algorithm using the retailer-specific item codes and the retailer transaction and produces retailer-specific item code vectors mapped within the retailer-specific vector space.

At 320, the basket segment recommendation service generates a segment-specific vector space from multiple retailer transactions based on multiple retailer barcoded item codes appearing in the multiple retailer transactions.

In an embodiment of 311 and 320, at 321, the basket segment recommendation service processes a second Word2Vec algorithm using multiple retailer barcoded item codes and multiple retailer transaction and produces multiple retailer barcoded item code vectors mapped within the segment-specific vector space.

At 330, the basket segment recommendation service receives current transaction item codes for a current transaction with the retailer during the current transaction.

At 340, the basket segment recommendation service replaces a non-barcoded item code in the current transaction item codes with a similar barcoded item code based on the retailer-specific vector space and produces a revised item code for the current transaction item codes.

In an embodiment of 321 and 240, at 341, the basket segment recommendation service obtains candidate item codes for the non-barcoded item code, filters the candidate item code against a retailer-specific item catalogue and produces filtered candidate item codes that are associated with barcodes, and the basket segment recommendation service selects the similar barcoded item code from the filtered candidate item barcodes.

At 350, the basket segment recommendation service identifies a recommended item code based on the revised item codes positioned within the segment-specific vector space.

In an embodiment of 341 and 350, at 351, the basket segment recommendation service obtains second candidate item codes for the revised item codes, filters the second candidate item codes against the retailer-specific item catalogue and produces second filtered candidate item codes, and the basket segment recommendation service selects the recommended item code from the second filtered candidate item codes.

At 360, the basket segment recommendation service provides the recommended item code to a transaction service during processing of the transaction for presentation to a customer associate with the transaction.

In an embodiment, at 370, the basket segment recommendation service receives feedback indicating whether the recommended item code was purchased with the retailer. The basket segment recommendation service uses transaction details associated with the transaction, the recommended item code, and the revised item codes to train a machine-learning model associated with a machine-learning algorithm to provide a subsequent recommended item code for a subsequent transaction of the retailer. That is, the machine-learning model/algorithm is continuously trained and eventually is used for providing the recommended item for a given basket of a subsequent transaction processed by the retailer.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
    obtaining, by a processor, executable instructions causing the processor to perform operations, comprising:
        maintaining a retail-service platform that host multiple tenants associated with a transaction environment;
        obtaining item codes for items in a transaction with a retailer, wherein a retail server associated with the retailer is connected to the retail-service platform as a first tenant of the retail-service platform;
        acquiring a segment constraint associated with the transaction from the retail server as a particular constraint associated with transactions of the retailer;
        identifying a particular item code associated with a particular item that lacks an item barcode from the item codes;
        determining a similar item code for a similar item to the particular item from a retailer-specific vector space defined for retailer item codes of the retailer plotted in multidimensional space, wherein distances between retailer item codes within the multidimensional space represent similarities between the retailer item codes;
        revising the item codes by replacing the particular item code with the similar item code producing revised item codes for the transaction;
        determining a recommended item code based on the revised item and a segment-specific vector space associated with the segment constraint; and
        providing, to the retail server, the recommended item code to an interface associated with the transaction for recommending to a customer associated with the transaction during the transaction.

2. The method of claim 1, wherein obtaining the item codes further includes receiving the item codes in real time from an Application Programming Interface (API) during the transaction.

3. The method of claim 1, wherein determining the similar item code further includes receiving similarity scores for candidate item codes from an item vector space and mapper service.

4. The method of claim 3, wherein receiving the similarity scores further includes selecting the similar item code based on a particular similarity score selected from the similarity scores that is associated with the similar item code.

5. The method of claim 4, wherein selecting the similarity item code further include verifying that the similar item code is associated with a retailer product item code having a barcode.

6. The method of claim 5, wherein determining the recommended item code further includes receiving second similarity scores for second candidate item codes from the item vector space and mapper service.

7. The method of claim 6, wherein receiving the second similarity scores further includes filtering the second candidate item codes through the an item catalogue for the retailer and obtaining retailer product item codes available from the retailer.

8. The method of claim 7, wherein filtering further includes selecting the recommended item code based on the second similarity scores and the retailer provided item codes.

9. The method of claim 7, wherein filtering further includes providing the segment constraint, the revised codes, the second similarity scores, transaction details for the transaction, and the retailer provided item codes to a trained machine-learning model associated with a trained machine-learning algorithm.

10. The method of claim 9, wherein providing the segment constraint further includes receiving the recommended item code as output from the trained-machine learning model.

11. The method of claim 10, wherein providing the recommended item code further includes obtaining a feedback after the transaction indicating whether the recommended item code was purchased in the transaction.

12. The method of claim 11 further operations comprising, using the feedback in a subsequent training session of the trained machine-learning model.

13. A method, comprising:
obtaining, by a processor, executable instructions causing the processor to perform operations, comprising:
maintaining a retail-service platform that host multiple tenants associated with a transaction environment;
connecting a retail server associated with a retailer to the retail-service platform as a first tenant of the retail-service platform;
generating a retailer-specific vector space associated with a retailer for retailer transactions based on retailer item codes appearing in the retailer transactions, wherein the retailer-specific vector space is defined for retailer item codes of the retailer plotted in multidimensional space, wherein distances between retailer item codes within the multidimensional space represent similarities between the retailer item codes;
generating a segment-specific vector space for multiple retailer transactions based on multiple retailer barcoded item codes appearing in the multiple retailer transactions;
receiving, from the retail server, current transaction item codes for a current transaction with the retailer during the current transaction;
replacing a non-barcoded item code in the current transaction item codes with a similar barcoded item code based on the retailer-specific vector space and producing revised item codes for the current transaction item codes;
identifying a recommended item code based on the revised item codes positioned within the segment-specific vector space; and
providing, to the retail server, the recommended item code to a transaction service during processing of the transaction for presentation to a customer associated with the transaction and during the transaction.

14. The method of claim 13, wherein generating the retailer-specific vector space further includes processing a first Word2Vec algorithm using retailer-specific item codes and the retailer transactions and producing retailer-specific item code vectors mapped within the retailer-specific vector space.

15. The method of claim 14, wherein generating the segment-specific vector space further includes processing a second Word2Vec algorithm using the multiple retailer barcoded item codes and the multiple retailer transactions and producing multiple retailer barcoded item code vectors mapped within the segment-specific vector space.

16. The method of claim 15, wherein replacing further include obtaining candidate item codes for the non-barcoded item code, filtering the candidate item codes against a retailer-specific item catalogue and producing filtered candidate item codes associated with barcodes, and selecting the similar barcoded item code from the filtered candidate item codes.

17. The method of claim 16, wherein identifying further includes obtaining second candidate item codes for the revised item codes, filtering the second candidate item codes against the retailer-specific item catalogue and producing second filtered candidate item codes, and selecting the recommended item code from the second filtered candidate item codes.

18. The method of claim 13 further operations comprising, receiving feedback indicating whether the recommended item code was purchased with the transaction and using transaction details associated with the transaction, the recommended item code, and the revised item codes to train a machine-learning model associated with a machine-learning algorithm to provide a subsequent recommended item code for a subsequent transaction of the retailer.

19. A system, comprising:
at least one processing device having at least one processor configured to execute instructions from a non-transitory computer-readable storage medium;
the instructions when executed by the at least one processor from the non-transitory computer-readable storage medium cause the at least processor to perform operations comprising:
maintaining a retail-service platform that host multiple tenants associated with a transaction environment;
connecting a retail server associated with a retailer to the retail-service platform as a first tenant of the retail-service platform;

receiving, from the retail server, transaction items associated with a transaction being processed in real time by a retailer;

replacing non-barcoded items of the transaction items with most similar barcoded items available from the retailer and producing revised transaction items;

identifying at least one recommended item for the transaction based on a context of the revised transaction items plotted within a segment-specific vector space derived from multiple cross-retailer transactions associated with a segment, wherein the multiple cross-retailer transactions include some retailer-based transactions associated with the retailer, wherein the segment-specific vector space is defined for retailer item codes of the retailer plotted in multidimensional space, wherein distances between retailer item codes within the multidimensional space represent similarities between the retailer item codes; and providing the at least one recommended item to a transaction service of the retail service via an Application Programming Interface (API) for recommending to a customer associated with the transaction during the transaction.

20. The system of claim 19, wherein the instructions are provided as a cross-retailer segment-based transaction basket recommendation service over a network to transaction services associated each of the multiple retailers.

* * * * *